United States Patent [19]

Miyata

[11] Patent Number: 5,264,284
[45] Date of Patent: Nov. 23, 1993

[54] FIBROUS COMPOSITE METAL HYDROXIDE AND PROCESS FOR THE PRODUCTION THEREOF

[75] Inventor: Shigeo Miyata, Takamatsu, Japan

[73] Assignee: Kabushiki Kaisha Kaisui Kagaku Kenkyujo, Kagawa, Japan

[21] Appl. No.: 892,121

[22] Filed: Jun. 2, 1992

[30] Foreign Application Priority Data

Jun. 6, 1991 [JP] Japan .................. 3-162203

[51] Int. Cl.$^5$ .............................. C01F 5/14; B32B 3/00
[52] U.S. Cl. .................................. 428/364; 428/921; 428/920; 428/392; 428/401; 423/635; 423/636; 423/638; 423/639
[58] Field of Search ............... 423/635, 636, 638, 639; 428/392, 401, 364, 920, 921

[56] References Cited

U.S. PATENT DOCUMENTS 4,246,254 1/1981 Miyata et al. .................. 423/635

FOREIGN PATENT DOCUMENTS 2906759 8/1979 Fed. Rep. of Germany.

OTHER PUBLICATIONS

Kiyouwa Kagaku Kogyo K.K., Patent Abstracts of Japan, vol. 4, No. 159 (C-30)(641) Nov. 6, 1980 JP-A-55 104994.

*Primary Examiner*—Patrick J. Ryan
*Assistant Examiner*—Richard P. Weisberger
*Attorney, Agent, or Firm*—Wenderoth, Lind & Ponack

[57] ABSTRACT

A fibrous composite metal hydroxide containing a small amount of hexagonal-plate-like magnesium hydroxide and being therefore advantageously useful as a reinforcing material for resins and rubbers. The crystal water elimination temperature thereof can be set at any point between the crystal water elimination temperature of magnesium hydroxide and that of aluminum hydroxide. This fibrous composite metal hydroxide is excellent in flame retardancy and acid resistance. The fibrous composite metal hydroxide has an aspect ratio of about 10 or more, an average diameter of approximately 0.1 to 10 μm and an average length of approximately 2 to 1,000 μm, and having the formula (1), $$M^{2+}{}_xMg_{1-x}(OH)_2 \qquad (1)$$

wherein M is at least one member selected from Mn, Fe, Co, Ni, Cu and Zn and x is defined by $0.005 < x < 0.5$.

4 Claims, 1 Drawing Sheet

FIBROUS COMPOSITE METAL HYDROXIDE AND PROCESS FOR THE PRODUCTION THEREOF

FIELD OF THE INVENTION

The present invention relates to a novel fibrous composite metal hydroxide and a process for the production thereof. More specifically, it relates to a fibrous composite metal hydroxide suitable for use as/in a reinforcing and flame-retardant material for a resin and/or a rubber, flame-resistant paper, a filter material, a material for a fibrous composite oxide, a heat-insulating material, a concrete filler, a thickening agent for unsaturated polyester, an additive to a heavy oil, and an agent for neutralizing and inactivating residual acidic substances in a resin and a rubber.

PRIOR ART OF THE INVENTION

Inorganic fibers such as glass fibers are well known as a reinforcing material for resins and rubbers. In recent years, however, there has been an increasing demand for a flame retardant reinforcing material which, unlike glass fibers, is halogen-free and does not diminish the appearance of the reinforced material. To meet this demand, a fibrous magnesium hydroxide has been proposed (JP,A 54-112400 and JP,A 55-104994). This fibrous magnesium hydroxide is a microfibrous, halogen-free magnesium hydroxide fiber which has an average diameter of approximately 0.01 to 10 μm and an average length of approximately 0.1 to 10,000 μm and which exhibits flame retardancy equivalent to, or higher than, a conventional halogen-free, clean flame-retardant magnesium hydroxide.

The above magnesium hydroxide fiber is obtained by reacting an acicular-crystal basic magnesium compound having the formula (2), $$Mg(OH)_{2-y}A^-_y \cdot mH_2O \tag{2}$$

wherein $A^-$ is a monovalent anion, y is defined by $0.2 < y < 1$, and m is defined by $0 \leq m \leq 2$, with an alkali. However, this acicular-crystal, basic magnesium compound is easily hydrolyzed, and causes the following problem: When it is converted to the above fibrous magnesium hydroxide by the reaction thereof with an alkali, part of the acicular crystal is liable to be hydrolyzed to form a hexagonal-plate-like magnesium hydroxide together with the fibrous magnesium hydroxide. The larger the hexagonal-plate-like magnesium hydroxide content is, the lower the effect thereof on reinforcement of resins and rubbers is.

Further, the above halogen-free magnesium hydroxide fiber as a flame retardant has a problem in that its crystal water elimination temperature is slightly in excess of the ignition temperature of most resins and rubbers. However, when the crystal water elimination temperature is as low as that of aluminum hydroxide, the crystal water elimination begins to occur at a temperature for processing resins and rubbers, which elimination causes the foaming of resins and rubbers. Further, when the crystal water elimination temperature is higher than that of magnesium hydroxide just as the crystal water elimination temperature of calcium hydroxide is, the crystal water elimination temperature is higher than the ignition temperature of resins and rubbers, and the flame retardancy is extremely lower than those of not only magnesium hydroxide but aluminum hydroxide.

For this reason, it is strongly desired to develop a substance which undergoes crystal water elimination at a temperature at a midpoint between the crystal water elimination temperature of aluminum hydroxide and that of magnesium hydroxide. Further, the fibrous magnesium hydroxide has a problem in that it has poor acid resistance so that it is gradually dissolved when it is in contact with the acidic liquid.

SUMMARY OF THE INVENTION

It is an object of the present invention to provide a novel fibrous composite metal hydroxide.

It is another object of the present invention to provide a fibrous composite metal hydroxide containing a small amount of hexagonal-plate-like magnesium hydroxide which a conventional acicular-crystal basic magnesium compound is liable to form as a byproduct when converted to magnesium hydroxide and being therefore useful as a reinforcing material for resins and rubbers.

It is further another object of the present invention to provide a fibrous composite metal hydroxide of which the crystal water elimination temperature can be set at any point between the crystal water elimination temperature of magnesium hydroxide and that of aluminum hydroxide and which is useful as a flame retardant.

It is still further another object of the present invention to provide a fibrous composite metal hydroxide excellent in acid resistance.

Further, it is another object of the present invention to provide a process for the production of the fibrous composite metal hydroxide of the present invention.

According to the present invention, there is provided a fibrous composite metal hydroxide having an aspect ratio of about 10 or more, an average diameter of approximately 0.1 to 10 μm and an average length of approximately 2 to 1,000 μm, and having the formula (1), $$M^{2+}_x Mg_{1-x}(OH)_2 \tag{1}$$

wherein M is at least one member selected from Mn, Fe, Co, Ni, Cu and Zn and x is defined by $0.005 < x < 0.5$.

According to the present invention, there is also provided an acicular-crystal composite metal basic salt of the formula (5), $$M_x^{2+} Mg_{1-x}(OH)_{2-z} A^-_z \cdot mH_2O \tag{5}$$

wherein M is at least one member selected from Mn, Fe, Co, Ni, Cu and Zn, $A^-$ is a monovalent anion, m is defined by $0 \leq m \leq 2$, x is defined by $0.005 < x < 0.5$ and z is defined by $0.2 < z < 1$.

According to the present invention, there is further provided a process for the production of the fibrous composite metal hydroxide of the formula (1), which comprises adding an aqueous solution of a divalent transition metal salt of the formula (4), $$M^{2+} A^-_2 \tag{4}$$

wherein M is at least one member selected from Mn, Fe, Co, Ni, Cu and Zn, and $A^-$ is a monovalent anion, to an aqueous solution containing an acicular-crystal basic magnesium salt of the formula (2), $$Mg(OH)_{2-y}A^-_y \cdot mH_2O \quad (2)$$

wherein $A^-$ is as defined above, y is defined by $0.2 < y < 1$, and m is defined by $0 \leq m \leq 2$, and a water-soluble magnesium salt of the formula (3), $$MgA^-_2 \quad (3)$$

wherein $A^-$ is as defined above, allowing the resultant mixture to react to form an acicular-crystal composite metal basic salt of the formula (5), $$M^{2+}_xMg_{1-x}(OH)_{2-z}A^-_z \cdot mH_2O \quad (5)$$

wherein M and $A^-$ are as defined above, x is defined by $0.005 < x < 0.5$ and z is defined by $0.2 < z < 1$, separating the above acicular-crystal composite metal basic salt from reaction mother liquor, washing it and bring it to contact with an alkali in a liquid medium.

According to the present invention, there is further provided a process for the production of the fibrous composite metal hydroxide of the formula (1), which comprises adding an alkali to an aqueous solution containing a mixture of a water-soluble magnesium salt of the formula (3), $$MgA^-_2 \quad (3)$$

wherein $A^-$ is a monovalent anion, with a divalent transition metal salt of the formula (4), $$M^{2+}A^-_2 \quad (4)$$

wherein M is at least one member selected from Mn, Fe, Co, Ni, Cu and Zn, and $A^-$ is as defined above, in such amounts that the amount of the alkali is about 50 mol % or less based on the total molar amount of Mg and $M^{2+}$, allowing the mixture to react to form an acicular-crystal composite metal basic salt of the formula (5), $$M^{2-}_xMg_{1-x}(OH)_{2-z}A^-_z \cdot mH_2O \quad (5)$$

wherein M and $A^-$ are as defined above, x is defined by $0.005 < x < 0.5$ and z is defined by $0.2 < z < 1$, separating the acicular-crystal composite metal basic salt from reaction mother liquor, washing it and bringing it into contact with an alkali in a liquid medium.

DETAILED DESCRIPTION OF THE INVENTION

Figure 1:
FIG. 1 is the scanning electron microscope photograph showing the fiber form of the compound obtained in Example 1.

The present inventor has made a diligent study to overcome the above-described problems, and found the acicular-crystal composite metal basic salt of the above formula (5), which is a solid solution of a divalent transition metal. The presence of an acicular-crystal basic salt of a divalent transition metal per se has not been recognized, nor has the presence of a fibrous metal hydroxide of a divalent transition metal per se been recognized. In the formula (5), $A^-$ includes monovalent anions such as $F^-$, $Cl^-$, $Br^-$, $I^-$, $NO_3^-$, $ClO_4^-$, $HCOO^-$ and $CH_3COO^-$.

The acicular-crystal composite metal basic salt of the formula (5) has excellent hydrolysis resistance over an acicular-crystal basic magnesium salt of the following formula (2), $$Mg(OH)_{2-y}A^-_y \cdot mH_2O \quad (2)$$

wherein $A^-$ is a monovalent anion, y is defined by $0.2 < y < 1$, and m is defined by $0 \leq m \leq 2$.

Therefore, when the acicular-crystal composite metal basic salt is converted to hydroxide, the formation of a hexagonal plate-like crystal as a byproduct can be remarkably decreased.

Further, in the fibrous composite metal hydroxide of the present invention, which is represented by the formula (1), $$M^{2+}_xMg_{1-x}(OH)_2 \quad (1)$$

wherein M is at least one member selected from Mn, Fe, Co, Ni, Cu and Zn and x is defined by $0.005 < x < 0.5$, and which is obtained by bringing the acicular-crystal composite metal basic salt of the formula (5) into contact with an alkali, the crystal water elimination temperature decreases nearly in proportion to an increase in the amount of the transition metal as compared with the conventional fibrous magnesium hydroxide (disclosed in JP,A 54-112400), although the degree of the decrease in the crystal water elimination temperature depends on the contained transition metal. That is, the elimination of crystal water from the fibrous composite metal hydroxide of the present invention begins to occur at a temperature nearer to the ignition temperature of resins and rubbers as compared with the above conventional fibrous magnesium hydroxide. Further, the fibrous composite metal hydroxide shows improved acid resistance. When Ni is contained, the acid resistance is particularly remarkable. In the present invention, when x in the formula (1) is 0.5 or more, the composite metal hydroxide is nearly non-fibrous.

In the fibrous composite metal hydroxide of the present invention, the fibrous crystal has an average diameter of approximately 0.1 to 10 μm, an average length of approximately 2 to 1,000 μm and an aspect ratio of about 10 or more. The diameter, length and aspect ratio (length/diameter ratio) can be measured with a scanning electron microscope. Particularly preferably, the average diameter is approximately 0.1 to 1.0 μm, the average length is approximately 5 to 50 μm, and the aspect ratio is about 10 or more.

The crystal structure of the fibrous composite metal hydroxide of the present invention is similar to that of magnesium hydroxide. When a powder thereof is measured for an X-ray diffraction pattern, a diffraction figure appears nearly at the same angle as that of magnesium hydroxide. However, the diffraction strength on the (001) plane is characteristically higher than that on the (101) plane. The fibrous composite metal hydroxide has a higher refractive index than magnesium hydroxide. In addition, a hexagonal plate-like magnesium hydroxide shows diffraction strength reverse to the above.

The fibrous composite metal hydroxide of the present invention can be produced by any one of the following first and second processes.

In the first process, an aqueous solution of the divalent transition metal of the formula (4) is added to an aqueous solution containing the acicular-crystal basic magnesium salt of the formula (2) and the water-soluble magnesium salt of the formula (3) with stirring, and the resultant mixture is allowed to react. The reaction conditions are not specially limited. Preferably, the above mixture is allowed to react at a temperature between 0° C. and 100° C. for about 10 minutes or longer while it is stirred. When the acicular-crystal basic magnesium salt of the formula (2) is prepared, it is preferred to add an acicular-crystal basic magnesium salt of the formula (2) as a seed in an amount of approximately 10 to 20% by weight based on the acicular-crystal magnesium salt of the formula (2) to be formed.

The acicular-crystal composite metal basic salt of the formula (5) obtained by the above reaction is filtered and washed with water, an alcohol or an aqueous solution of alkali metal halide. Then, the acicular-crystal composite metal basic salt is brought into contact, and reacted, with an alkali such as sodium hydroxide, potassium hydroxide, calcium hydroxide or aqueous ammonia to replace $A^-_z$ with $OH^-$, whereby the basic salt of the formula (5) is converted to the fibrous composite metal hydroxide of the present invention.

Before the above conversion reaction, the basic salt of the formula (5) may be preliminarily dried at approximately 50° to 200° C. for approximately 30 minutes to several hours to eliminate part or all of the crystal water. The amount of the alkali for use in the conversion reaction is preferably about 0.7 to about 2 equivalent weight per equivalent weight of $A^-_z$. The conversion reaction may be carried out at room temperature. With an increase in the reaction temperature, the reaction rate tends to increase. For this reason, the reaction is preferably carried out at a temperature of about 80° C. or higher. The reaction may be also carried out under heat and pressure in an autoclave. For example, the alkali in the above amount is added to an aqueous medium of alkali metal halide, alkaline earth metal halide or alkaline earth metal acetate such as NaCl, KCl, $CaCl_2$ or $Ca(CH_3COO)_2$, and the conversion reaction of the basic salt of the formula (5) is carried out in the presence of the above aqueous medium under pressure at a temperature of approximately 100° to 250° C. for approximately 1 to 10 hours.

The so-obtained fibrous composite metal hydroxide has a well-grown single crystal and a small BET specific surface area.

In the second process, an alkali is added to a mixed aqueous solution containing the water-soluble magnesium salt of the formula (3) and the divalent transition metal salt of the formula (4) in such amounts that the amount of the alkali is not more than 50 mol % based on the total molar amount of magnesium and the transition metal, and the resultant mixture is allowed to react at a temperature of approximately 0° to 100° C., to give the acicular-crystal composite metal basic salt of the formula (5). Then, the so-obtained acicular-crystal composite metal basic salt is treated in the same manner as in the above first process, whereby the fibrous composite metal hydroxide of the present invention is obtained.

The water-soluble magnesium salt includes magnesium fluoride, magnesium chloride, magnesium bromide, magnesium iodide, magnesium nitrate, magnesium perchlorate, ion bittern, magnesium formate and magnesium acetate.

The divalent transition metal salt includes fluorides, chlorides, bromides, iodides, perchlorates, formates and acetates of Mn, Fe, Co, Ni, Cu and Zn.

The alkali includes aqueous ammonia, sodium hydroxide, potassium hydroxide, magnesium hydroxide, calcium hydroxide, and basic magnesium hydroxide $[Mg(OH)_{2-p}A^-_p \cdot aH_2O$ wherein $0 < p \leq 0.2$, $0 \leq a < 4$ and $A^{31}$ is a monovalent ion selected from $F^-$, $Cl^-$, $Br^-$, $I^-$, $NO_3^-$, $ClO_4^-$, $HCOO^-$ and $CH_3COO^-$].

There is observed a tendency that the higher the concentrations of the water-soluble magnesium salt and the divalent transition metal salt are, the more stably the compound of the formula (5) is formed. The alkali may be added in an amount of not more than 50 mol% based on the total molar amount of magnesium and the divalent metal. In this regard, the larger the added alkali amount is, the poorer the dispersibility and growth of the acicular crystal tend to be. Further, the smaller the added alkali amount is, the smaller the amount of the formed compound of the formula (5) tends to be. In view of these tendencies, the amount of the alkali is preferably approximately 1 to 20 mol%.

In the above first and second processes, the reaction temperature for the formation of the compound of the formula (5) is approximately 0° to 100° C., preferably approximately 10° to 40° C. Depending upon the reaction temperature and the alkali, the reaction time is approximately 1 hour to 20 days, preferably approximately 20 hours to 15 days. In order to recrystallize the once-formed compound of the formula (5), the reaction may be additionally carried out during the above reaction under heat of no more than 150° C. or under pressure for approximately 0.5 to 10 hours.

The acicular-crystal basic magnesium salt of the formula (2) includes $Mg_3(OH)_5Cl \cdot 4H_2O$, $Mg_2(OH)_3Cl \cdot 4H_2O$, $Mg_2(OH)_3Cl \cdot 2H_2O$ and $Mg_2(OH)_3Br \cdot 4H_2O$. When the acicular-crystal basic magnesium salt is added as a seed for a crystal, the amount of the seed based on the compound of the formula (2), to be formed, is approximately 10 to 20% by weight.

The fibrous composite metal hydroxide of the present invention may be surface-treated with surface treating agents used for conventional flame retardants, etc., which are added to resins and rubbers. The surface treating agent includes higher fatty acids, anionic surfactants, phosphate ester, a silane-, titanate- or aluminum-containing coupling agent and fatty acid esters of polyhydric alcohols. These surface treating agents may be used alone or in combination.

The present invention provides a novel fibrous composite metal hydroxide and a novel acicular-crystal composite metal basic salt.

The present invention provides a fibrous composite metal hydroxide of which the crystal water elimination temperature is set at a proper temperature and which is useful as a flame retardant.

The present invention provides a fibrous composite metal hydroxide containing a small amount of hexagonal-plate-like magnesium hydroxide which reduces the reinforcing effect on resins and rubbers.

The present invention provides an acicular-crystal composite metal basic salt useful for the production of the above fibrous composite metal hydroxide.

The present invention provides a fibrous composite metal hydroxide excellent in acid resistance.

The present invention will be described further in detail hereinafter by reference to Examples.

EXAMPLE 1

1.5 Liters of ion bittern containing 1.7 mol/l of magnesium chloride is charged into a 2-liter beaker, and the beaker was immersed in a constant-temperature bath at 40° C. While the ion bittern was stirred with a chemistirrer, 15 g of water containing 29% by weight of ammonia (of which the amount corresponded to 5 mol % based on the amount of the magnesium) was added. With continuously stirring, the mixture was allowed to react for 10 days to form an acicular crystal of $Mg_2(OH)_3Cl.4H_2O$.

After 10 days, 0.008 mol of ferrous chloride as a first-grade reagent in an aqueous solution state was added, and the resultant mixture was allowed to react for 1 hour with stirring. The reaction mixture was filtered under reduced pressure and washed with water, and then the remainder was placed in 600 ml of deionized water in which 10 g of sodium hydroxide had been preliminarily dissolved and which had been heated up to 90° C. Then, the mixture was dispersed and allowed to react with stirring at 90° C. for about 20 minutes. Then, the reaction mixture was filtered under reduced pressure, washed with water and dried to give a composite metal hydroxide. The above procedures were all carried out in an non-oxidative atmosphere ($N_2$).

In the X-ray diffraction pattern of a powder of the above composite metal hydroxide, the (001) plane showed a maximum peak. Therefore, the X-ray diffraction pattern was nearly the same as that of $Mg(OH)_2$ except that the diffraction strengths of the (001) and (101) planes of the above composite metal hydroxide were reverse to those of magnesium hydroxide. Further, the above composite metal hydroxide was measured for a chemical composition by a chemical analysis method, for a peak temperature of its crystal water elimination by a differential thermal analysis (DTA) method, and for an average fiber diameter and an average fiber length by a scanning electron microscope. FIG. 1 shows the scanning electron microscope photograph of the above-obtained composite metal hydroxide.

Chemical composition: $Fe_{0.05}Mg_{0.95}(OH)_2$

Table 1 shows the other measurement results.

EXAMPLE 2

Example 1 was repeated except that 0.006 mol of maganese chloride as a first-grade reagent was added to the same acicular crystal of $Mg_2(OH)_3Cl.4H_2O$ as that obtained in Example 1 in place of the ferrous chloride, whereby a composite metal hydroxide was obtained. The so-obtained composite metal hydroxide was measured for a chemical composition, a peak temperature of its crystal water elimination, an average fiber diameter and an average fiber length in the same manner as in Example 1.

The X-ray diffraction pattern of the so-obtained composite metal hydroxide was nearly the same as that of $Mg(OH)_2$ except that the (001) plane showed a maximum peak.

Chemical composition: $Mn_{0.04}Mg_{0.96}(OH)_2$

Table 1 shows the other measurement results.

EXAMPLE 3

1.5 Liters of ion bittern containing 1.7 mol/l of magnesium chloride was placed in a 2-liter beaker, and the beaker was immersed in a constant-temperature bath at 40° C. While the ion bittern was stirred with a chemistirrer, 102 ml of water containing 5 mol/l of ammonia (of which the amount corresponded to 5 mol% based on the amount of magnesium) was added. With continuously stirring, the mixture was allowed to react for 4 days to form an acicular crystal of $Mg_3(OH)_5Cl.4H_2O$.

100 Milliliters of the above-obtained slurry of the acicular crystal was added to a 2-liter beaker which had been charged with 1.5 liters of ion bittern containing 1.7 mol/l of magnesium chloride. While the resultant mixture was stirred at 40° C., 102 ml of aqueous ammonia containing 5 mol/l of ammonia (of which the amount corresponded to 10 mol% based on the magnesium) was added, and then the resultant mixture was allowed to react for 24 hours to give a slurry of an acicular crystal of $Mg_3(OH)_5Cl.4H_2O$. The above procedures were all carried out in an non-oxidative atmosphere ($N_2$).

0.035 Mol of cobalt chloride as a first-grade reagent in an aqueous solution state was added to the above-obtained slurry, and the resultant mixture was allowed to react for about 30 minutes with stirring. The reaction mixture was filtered under reduced pressure, and the remainder was washed with an aqueous solution containing 1 mol/l of NaCl to give a cake. The cake was emulsified in 300 ml of an aqueous solution containing 1 mol/l of NaCl with a homomixer. The so-prepared emulsion was placed in a 2-liter beaker containing 1 liter of deionized water in which 10 g of sodium hydroxide had been preliminarily dissolved and which had been heated up to 90° C., and the resultant mixture was stirred and allowed to react at 90° C. for about 30 minutes with stirring. The reaction mixture was filtered under reduced pressure, washed with water and dried. The so-obtained composite metal hydroxide was measured for a chemical composition, a peak temperature of its crystal water elimination, an average fiber diameter and an average fiber length in the same manner as in Example 1.

The above-obtained composite metal hydroxide had nearly the same X-ray diffraction pattern as that of $Mg(OH)_2$ except that the (001) plane showed a maximum peak.

Chemical composition: $Co_{0.10}Mg_{0.90}(OH)_2$

Table 1 shows the other measurement results.

EXAMPLE 4

2 Liters of an aqueous solution containing 2.1 mol/l of magnesium was prepared by dissolving magnesium chloride ($MgCl_2.6H_2O$) as a first-grade reagent in deionized water. 84 Milliliters of an aqueous solution containing 2 mol/l of calcium hydroxide was dissolved in the above aqueous solution, and the resultant mixture was allowed to react at 30° C. for 6 days with stirring to form an acicular crystal of $Mg_2(OH)_3Cl.4H_2O$.

Then, 62 ml of an aqueous solution containing 1 mol/l of nickel chloride as a first-grade reagent was added to the above-obtained product, and the resultant mixture was further allowed to react for 1 day. The so-obtained reaction mixture was filtered, and the remainder was washed with water. An aqueous solution containing 2 mol/l of potassium chloride was added to the above remainder, and the mixture was emulsified with a homomixer to obtain a slurry. The slurry was placed in a 1-liter beaker which had been charged with about 400 ml of an aqueous solution containing 15 g of NaOH and having a temperature of 95° C., and the mixture was stirred for about 20 minutes. Then, the reaction mixture was filtered under reduced pressure, and the remainder was washed with water and dried to give a composite metal hydroxide. The so-obtained composite metal hydroxide was measured for a chemical composition, a peak temperature of its crystal water elimination, an average fiber diameter and an average fiber length in the same manner as in Example 1.

The above-obtained composite metal hydroxide had nearly the same X-ray diffraction pattern as that of $Mg(OH)_2$ except that the (001) plane showed a maximum peak.

Chemical composition: $Ni_{0.18}Mg_{0.82}(OH)_2$

Table 1 shows the other measurement results.

EXAMPLE 5

1.5 Liters of an aqueous solution containing 2.5 mol/l magnesium was prepared by dissolving magnesium chloride ($MgCl_2.6H_2O$) in deionized water, and charged into a 2-liter beaker. The beaker was placed in a constant-temperature bath at 50° C., and while the aqueous solution was stirred with a chemistirrer, 0.02 mol of zinc nitrate as a first-grade reagent was dissolved in it. Then, 100 ml of a slurry of $Mg_2(OH)_3Cl.4H_2O$ prepared in the same manner as in Example 4 was added to the above beaker.

Separately, 150 ml of an aqueous solution containing 2.5 mol/l of magnesium chloride at 20° C. was placed in a 500-milliliter beaker, and while the aqueous solution was stirred, 150 ml of an aqueous solution containing 2 mol/l of calcium hydroxide was added. The resultant mixture was allowed to react for about 10 minutes to form basic magnesium chloride, $Mg(OH)_{1.8}Cl_{0.2}.mH_2O$ (of which the amount corresponded to 8 mol % based on the total molar amount of Mg and Zn).

The above-prepared basic magnesium chloride, while it was in a slurry state, was added to the above 2-liter beaker, and the resultant mixture was allowed to react for 2 days to give a reaction mixture containing a product of $Mg_2(OH)_3Cl.4H_2O$. The reaction mixture was filtered under reduced pressure, and the remainder was washed with water and then emulsified in 300 ml of water with a homomixer. The resultant emulsion was placed in a 1-liter beaker which had been charged with an aqueous solution containing 15 g of NaOH and having a temperature of 85° C., and the resultant mixture was stirred for about 20 minutes. Then, the reaction mixture was filtered under reduced pressure, and the remainder was washed with water and dried. The so-obtained composite metal hydroxide was measured for a chemical composition, a peak temperature of its crystal water elimination, an average fiber diameter and an average fiber length in the same manner as in Example 1.

The above-obtained composite metal hydroxide had nearly the same X-ray diffraction pattern as that of $Mg(OH)_2$ except that the (001) plane showed a maximum peak.

Chemical composition: $Zn_{0.05}Mg_{0.95}(OH)_2$

Table 1 shows the other measurement results.

EXAMPLE 6

Example 5 was repeated except that the zinc nitrate was replaced with cupric chloride as a first-grade reagent.

The resultant composite metal hydroxide was measured for a chemical composition, a peak temperature of its crystal water elimination, an average fiber diameter and an average fiber length in the same manner as in Example 1.

The above-obtained composite metal hydroxide had nearly the same X-ray diffraction pattern as that of $Mg(OH)_2$ except that the (001) plane showed a maximum peak.

Chemical composition: $Cu_{0.05}Mg_{0.95}(OH)_2$

Table 1 shows the other measurement results.

EXAMPLE 7

Example 5 was repeated except that the zinc nitrate was replaced with 0.16 mol of nickel chloride as a first-grade reagent.

The resultant composite metal hydroxide was measured for a chemical composition, a peak temperature of its crystal water elimination, an average fiber diameter and an average fiber length in the same manner as in Example 1.

The above-obtained composite metal hydroxide had nearly the same X-ray diffraction pattern as that of $Mg(OH)_2$ except that the (001) plane showed a maximum peak.

Chemical composition: $Ni_{0.40}Mg_{0.60}(OH)_2$

Table 1 shows the other measurement results.

COMPARATIVE EXAMPLE 1

Example 5 was repeated except that the zinc nitrate was replaced with 0.24 mol of nickel chloride as a first-grade reagent.

The resultant composite metal hydroxide was measured for a chemical composition, a peak temperature of its crystal water elimination, an average fiber diameter and an average fiber length in the same manner as in Example 1.

The above-obtained composite metal hydroxide had nearly the same X-ray diffraction pattern as that of $Mg(OH)_2$ except that the (001) and (101) planes showed nearly the same strength.

Chemical composition: $Ni_{0.6}Mg_{0.4}(OH)_2$

Table 1 shows the other measurement results.

COMPARATIVE EXAMPLE 2

1.5 Liters of an aqueous solution containing 2.5 mol/l of magnesium chloride was prepared by dissolving magnesium chloride as a first-grade reagent in deionized water, and charged into a 2-liter beaker. The beaker was placed in a constant-temperature bath at 40° C. While the aqueous solution was stirred, 75 ml of an aqueous solution containing 2 mol/l of calcium hydroxide (of which the amount corresponded to 4 mol % based on Mg) was added, and the resultant mixture was allowed to react for 6 days to give a slurry of an acicular crystal of $Mg_2(OH)_3Cl.4H_2O$.

The above-obtained slurry was filtered under reduced pressure, and the remainder was washed with water and dispersed in water. The resultant slurry was added to about 400 ml of an aqueous solution containing 15 g of NaOH and a temperature of 90° C., and while the temperature of the slurry was maintained at 90° C., the resultant mixture was stirred for about 20 minutes. The slurry was filtered under reduced pressure, and the remainder was washed with water and dried. The resultant hydroxide was measured for a chemical composition, a peak temperature of its crystal water elimination, an average fiber diameter and an average fiber length in the same manner as in Example 1.

The above hydroxide had nearly the same X-ray diffraction pattern as that of $Mg(OH)_2$ except that the (001) plane showed a maximum peak.

Chemical composition: $Mg(OH)_2$

Table 1 shows the other measurement results.

TABLE 1

| | Fiber average | | Aspect ratio | Crystal water elimination temperature at peak (°C.) | Crystal formation** |
|---|---|---|---|---|---|
| | diameter* | length* | | | |
| Ex. 1 | 0.3 | 30 | 75 | 402 | No |
| Ex. 2 | 0.3 | 20 | 67 | 410 | No |
| Ex. 3 | 0.4 | 15 | 38 | 390 | No |
| Ex. 4 | 0.6 | 30 | 50 | 393 | No |
| Ex. 5 | 0.3 | 13 | 43 | 395 | No |
| Ex. 6 | 0.4 | 15 | 38 | 389 | No |
| Ex. 7 | 0.2 | 5 | 25 | 368 | slight |
| CEx. 1*** | — | — | 5 or less | 342 | slight |
| CEx. 2 | 0.5 | 15 | 30 | 420 | slight |

Notes:
Ex. = Example,
CEx. = Comparative Example
*unit = μm
**Formation of hexagonal plate-like crystal, observed with a scanning electron microscope
***Almost no fiber state

EXAMPLE 8 AND COMPARATIVE EXAMPLE 3

200 Milligrams of a sample was exactly weighed out from each of the products obtained in Examples 3, 4 and 7 and Comparative Example 2, and these samples were respectively placed in 50-milliliter beakers each containing 25 ml of deionized water at 37.5° C. Then, the beakers were placed in a constant-temperature bath set at 37.5° C. 1N-HCl was automatically added to the beakers with stirring and maintaining the pH 4 of the solutions with a pH stat tester, and the amount of added 1N-HCl every predetermined unit time was recorded. Table 2 shows periods of time until 70 mol % of each of the samples was dissolved in the deionized water.

TABLE 2

| Sample from: | pH stat test (minute) at pH 4 | |
|---|---|---|
| Ex. 8-1 | Ex. 3 | 2.1 |
| Ex. 8-2 | Ex. 4 | 5.0 |
| Ex. 8-3 | Ex. 7 | 49.2 |
| CEx. 3 | CEx. 2 | 0.6 |

Ex. = Example,
CEx. = Comparative Example

What is claimed is:

1. A fibrous composite metal hydroxide having an aspect ratio of about 10 or more, an average diameter of approximately 0.1 to 10 μm and an average length of approximately 2 to 1,000 μm, and having the formula (1), $$M^{2+}{}_xMg_{1-x}(OH)_2 \qquad (1)$$

wherein M is at least one member selected from Mn, Fe, Co, Ni, Cu and Zn and x is defined by $0.005 < x < 0.5$.

2. A fibrous composite metal hydroxide according to claim 1, wherein the aspect ratio is at least 10, the average diameter is 0.1 to 1.0 μm, and the average length is 5 to 50 μm.

3. An acicular-crystal composite metal basic salt of the formula (5), $$M^{2+}{}_xMg_{1-x}(OH)_{2-z}A^-{}_z \cdot mH_2O \qquad (5)$$

wherein M is at least one member selected from Mn, Fe, Co, Ni, Cu and Zn, $A^-$ is a monovalent anion, m is defined by $0 \leq m \leq 2$, x is defined by $0.005 < x < 0.5$ and z is defined by $0.2 < z < 1$.

4. A fibrous composite metal hydroxide according to claim 1, wherein the composite metal hydroxide of the formula (1) is surface-treated with at least one surface treating agent selected from the group consisting of higher fatty acids, anionic surfactants, phosphate ester, a silane-, titanate- or aluminum-containing coupling agent and fatty acid esters of polyhydric alcohols.

* * * * *